FIG. 1.

INVENTOR.
GEORGE B. SPEIDEL

INVENTOR.
GEORGE B. SPEIDEL

FIG. 7.

United States Patent Office 3,076,389
Patented Feb. 5, 1963

3,076,389
BOX MAKING MACHINE
George B. Speidel, Cheltenham, Pa., assignor to Metal Edge Industries, Barrington, N.J., a corporation of New Jersey
Filed Feb. 28, 1961, Ser. No. 92,213
12 Claims. (Cl. 93—41.1)

This invention relates generally to box making machines, and particularly to a multi-station box making machine wherein a succession of blanks cornered and scored for folding are successively presented to each of the stations, and a different operation is performed upon the blanks at each of the stations for progressively advancing the fabrication thereof in the production of fully formed and stayed boxes.

An object of the invention is to shorten the cycles of such a machine by providing the machine with separate loading and unloading stations.

Another object of the invention is to provide such a machine with staying devices capable, without any change of parts, of staying the corners of boxes varying in size and shape within a relatively wide range.

Another object of the invention is to provide a machine having such staying devices with means for overfolding side panels of the boxes a full 120 degrees before they are stayed.

Another object of the invention is to provide such a machine which receives blanks in unfolded, flat condition so that they can be fed to the machine from many known types of feeders.

Another object of the invention is to provide such a machine having no direct connection between the staying devices and the work holding and indexing means except through the work itself, in consequence of which none of the heavy stay applying forces are transmitted to the work holding and indexing means.

Other objects of the invention will become apparent when the following description is read with reference to the accompanying drawings, in which.

Figure 1:
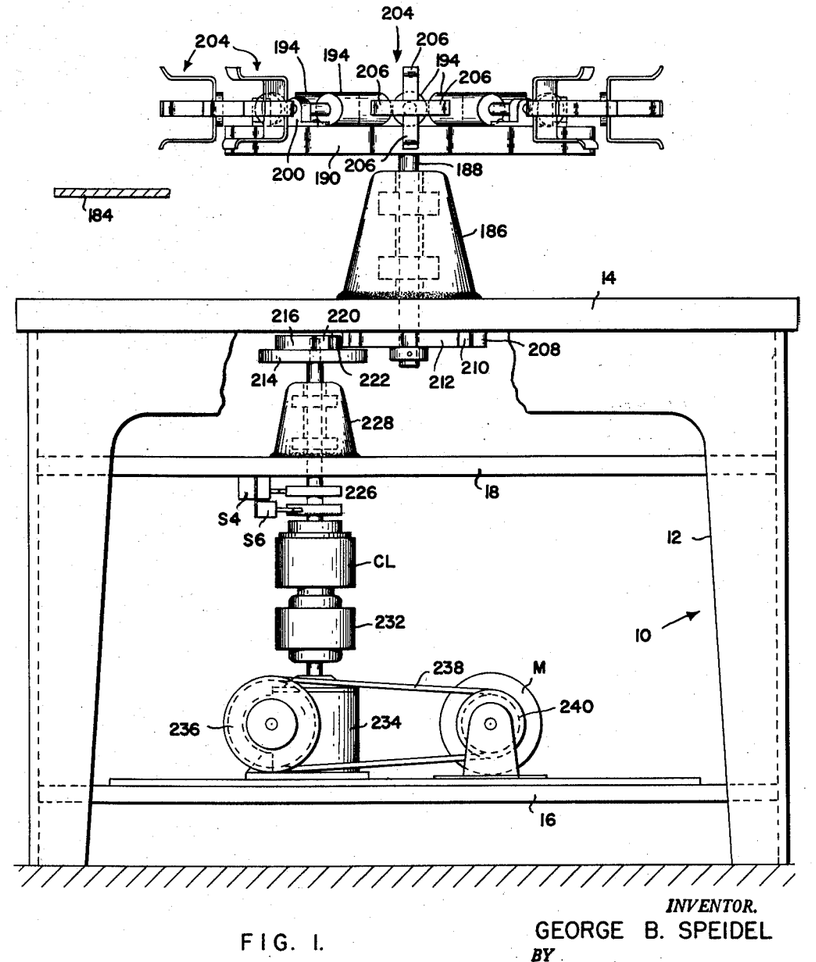
FIGURE 1 is an elevation of a box making machine embodying the invention, showing principally the mechanism for indexing the work.

Referring to the drawings and particularly to FIGURE 1, a box making machine constructed in accordance with the invention is provided with a frame 10 having vertically extending legs 12, a horizontally extending bedplate 14, a horizontally extending upper shelf 18 vertically spaced from the bedplate 14 and the lower shelf 16. The several members of the frame 10 are secured together, as by welding, to make the frame rigid.

Figure 2:
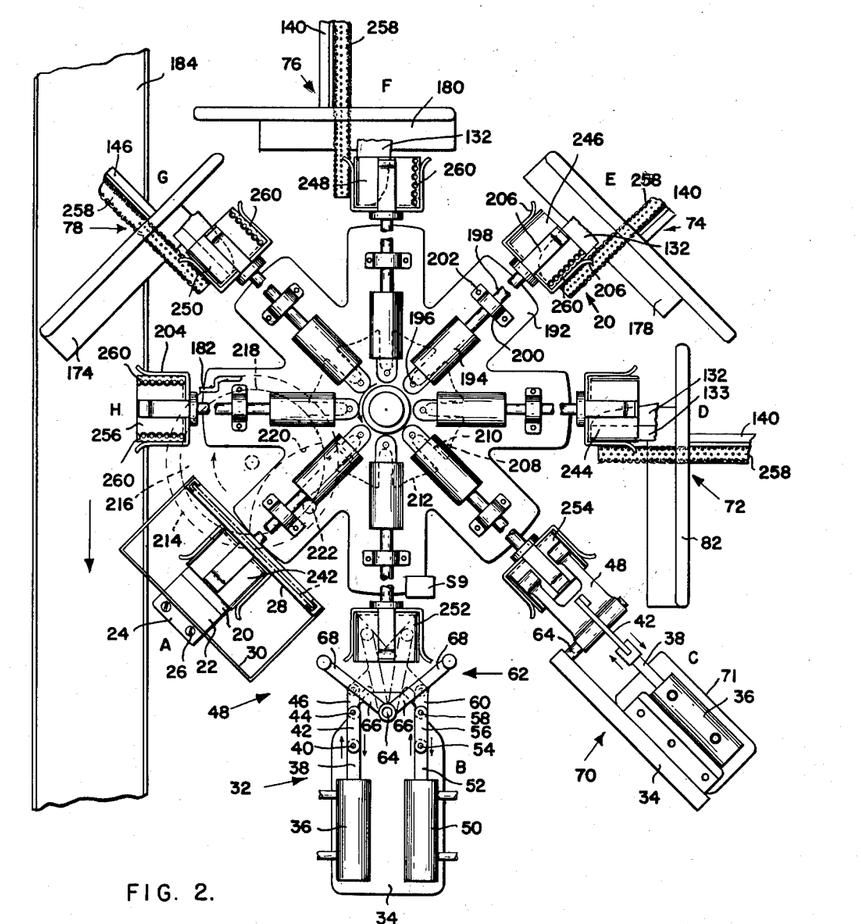
FIGURE 2 is an enlarged plan view of the mechanism shown in FIGURE 1.

Referring to FIGURE 2, angularly spaced equally about the center of the bedplate 14 are a series of stations, designated by the letters A through H. The letter A designates a loading station. The letters B and C designate respectively first and second over-fold stations. The letters D, E, F and G designate respectively first, second, third and fourth staying stations. The letter H designates an eject station.

At station A there is a mandrel 20 carried by a vertically extending bracket 22 provided with a flange 24. This flange is seated upon the bedplate 14 and secured thereto by screws 26. Proximate the face of the mandrel presenting toward the center of the bedplate 14 is a frame 28 adapted for receiving and positioning the work with respect to the mandrel. The frame is U-shaped, being provided with laterally spaced upright legs and a crosspiece tying these legs together. The top of the frame is open and the legs thereof are channel-shaped in transverse section for loosely receiving the opposite side edges of a blank dropped into the frame through the open top thereof.

At station B there is an over-fold device, generally designated 32. This device has a horizontally extending base 34 supported upon a suitable bracket (not shown) which in turn is affixed to the bedplate 14. Mounted upon the base 34 is an air cylinder 36. A piston works in the cylinder 36 and has a piston rod 38 bearing a pivot 40 which has attached thereto a link 42 bearing a pivot 44. A lateral extension 46 of an over-fold arm, generally designated 48, is attached to the pivot 44. Also mounted upon the base 34 is an air cylinder 50. A piston works in the cylinder 50 and has a piston rod 52 bearing a pivot 54 which has attached thereto a link 56 bearing a pivot 58. A lateral extension 60 of an over-fold arm 62 is attached to the pivot 58. The base 34 mounts an upright pivot pin 64 to which are attached the proximate end portions 66 of the over-fold arms. The working ends of the over-fold arms, designated 68, are bifurcated.

At station C there is a second over-fold device 70 the same in every respect as the over-fold device 32, except that the base 34 extends vertically and is carried by a suitable bracket 71 affixed to the bedplate 14.

At stations D, E, F and G there are stayer devices, generally designated respectively 72, 74, 76 and 78. These stayer devices are alike in all essential respects, in consequence of which a description of the stayer device 72 will suffice for a full understanding of the invention.

Referring to FIGURES 2 through 6, the staying device 72 includes a support 80 affixed to the bedplate 14. Seated upon the support 80 is a bracket member 82 provided with a base flange 84 affixed to the support 80, as by bolts 86. Extending along one side of the bracket member 82 is a rib 88. Overlying the bracket member 82 is a plate 90 having at the top and bottom thereof elongated openings 92. Studs 94 extend through the openings 92 and are threaded into the plate 90 for securing the plate 90 to the bracket member 82. A bolt 96 is threaded through the rib 88 and the end thereof engages the opposed edge of the plate 90. Overlying the plate 90 is a frame 98 having formed therein elongated openings 100. For securing the frame 98 to the plate 90, studs 102 extend through the openings 100 and are threaded into the plate 90. At the base of the plate 90 is a flange 104 through which is threaded a bolt 106. The end of the bolt engages the opposed edge of the frame 98.

Figure 4:
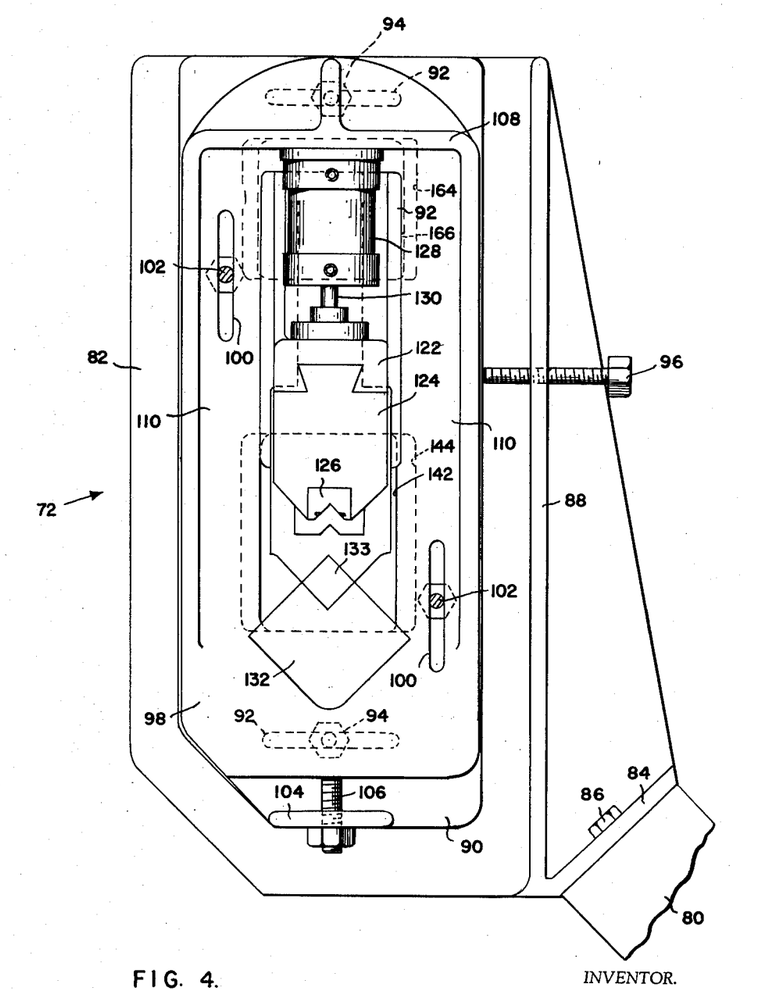
FIGURE 4 is a front view of a staying device.
Figures 5, 6:
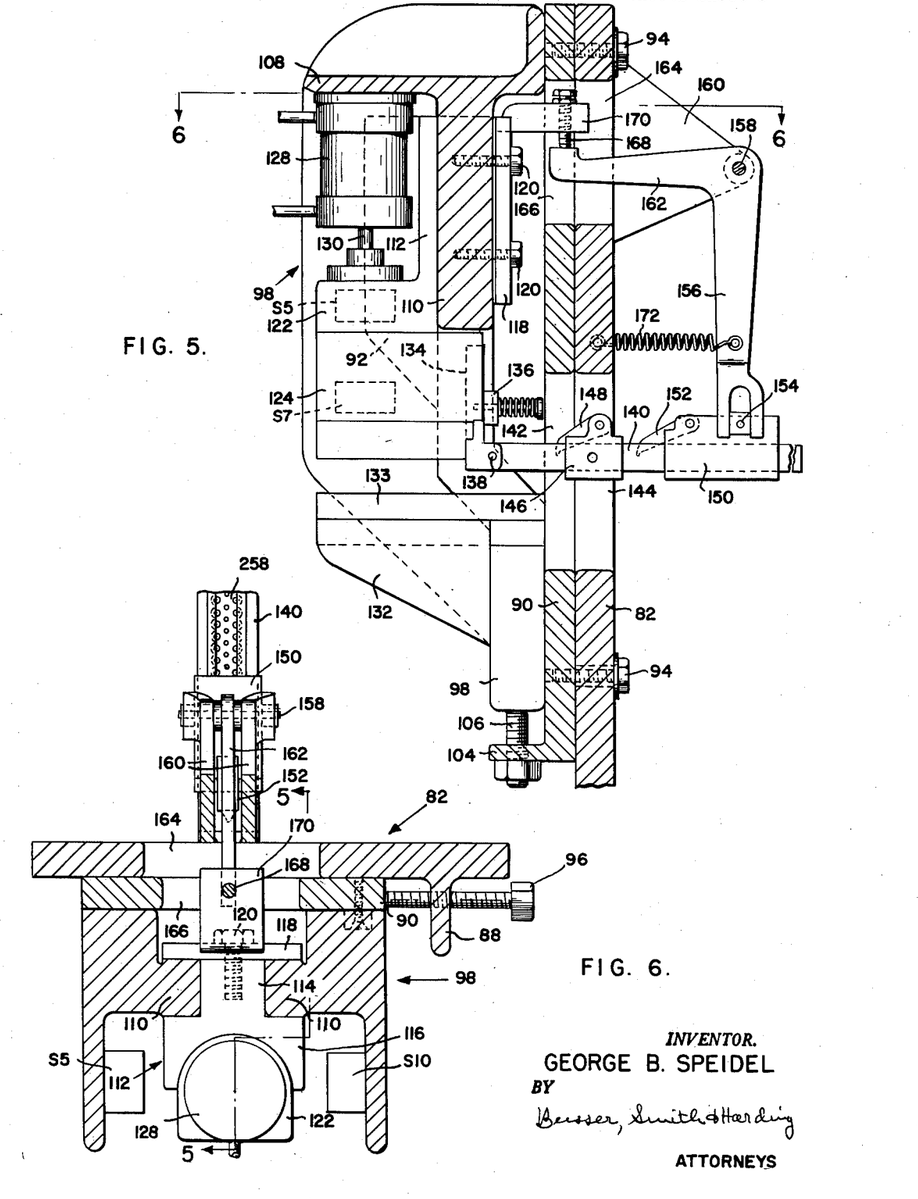
FIGURE 5 is a longitudinal section of the staying device taken generally on the plane indicated by line 5—5 of FIGURE 6.
FIGURE 6 is a horizontal section on the plane indicated by line 6—6 of FIGURE 5.

The frame 98 is provided with a horizontally extending head portion 108 and opposite side laterally spaced intermediate portions 110, these intermediate portions being spaced from the plate 90. A die mount 112, T-shaped in transverse section, is slidably carried by the frame 98. The stem 114 is disposed between the portions 110 of the frame and the head 116 overlies the portions 110 of the frame. A lock plate 118 is secured to the die mount 112, as by studs 120, to keep the same in place. At the base of the die mount 112 is a lateral extension 122 in which is adjustably mounted a die block 124 carrying a die insert 126. For actuating the die mount 112 an air cylinder 128 is secured to the head portion 108 of the frame. Working in the cylinder 128 is a piston provided with a rod 130 attached to the lateral extension 122 of the die mount 112.

Underlying the die insert 126 is a nose piece 132 affixed to the frame 98 and carrying a horizontally extending anvil bar 133.

Carried by the die block 124 is a cutter slide 134 held in position by a spring-pressed cover plate 136. The die block carries a pivot 138 to which is attached one end portion of a throat member 140 which extends horizontally through an opening 142 formed in the plate 90 and an opening 144 formed in the bracket member 82. Mounted upon the throat member 140 is a stationary pawl carrier 146 which carries a pawl 148. Also mounted upon the throat member 140 is a movable pawl carrier 150 which carries a pawl 152. The carriage 150 mounts a pivot 154, to which is attached one end portion of an arm 156 of a bell crank. The bell crank is pivoted, as at 158, to a bracket 160. The other arm 162 of the bell crank extends into an opening 164 formed in the bracket member 82 and an opening 166 formed in the plate 90. A bolt 68 is threaded through an extension 170 of the lock plate 118 and the end of the bolt engages the bell crank arm 162. As viewed in FIGURE 5, the bell crank is biased in clockwise direction by a tension spring 172. As indicated hereinabove, the stayer devices 72, 74, 76 and 78 are alike in all essential respects. However, it should be noted that the bracket member at station G, designated 174, is made to the left-hand of bracket 82 and affixed to a support 176. In addition, the bracket members at stations E and F, respectively designated 178 and 180, are suitably altered and seated directly upon the bedplate 14.

At station H there is an eject nozzle 182 directed at the base of the box for dislodging it from the holder 204 and depositing it by gravity upon a belt conveyor 184.

Referring particularly to FIGURES 1 and 2, a bearing unit 186 is mounted upon the bedplate 14 and has journalled therein a shaft 188. Affixed to the upper end portion of this shaft is a disc 190 having V-shaped notches in the periphery thereof for forming radially extending projections 192 angularly spaced equally about the disc. Associated with each of these projections is an air cylinder 194 having its inner end secured, as by a pin 196, to the disc 190. Working in the cylinder 194 is a piston having a rod 198 slidably projected through a bearing 200 secured in position by bolts 202.

At the outer extremity of the rod 190 is a work holder, generally designated 204, provided with four fingers 206.

Underlying the bedplate 14 is a Geneva mechanism including a wheel 208 affixed to the lower end portion of the shaft 188. This wheel is provided with radially inwardly extending openings 210 angularly spaced equally about the wheel. The rim of the wheel between each successive pair of openings 210 is scalloped, as at 212. The Geneva mechanism also includes a drive wheel 214 provided with a raised crescent-shaped area 216 defined by an arcuate shoulder 218, the center of which is coincident with the center of the wheel, and by a second arcuate shoulder 220, as shown. The wheel 214 mounts a pin 222 disposed opposite the shoulder 220. This wheel is affixed to the upper end portion of a vertically extending shaft 226 journalled in a bearing unit 228 mounted upon the shelf 18. At the lower end of the shaft 226 is a clutch CL, a coupling 232 and a speed reducer 234. This speed reducer is mounted upon the shelf 16 and mounts a pulley 236 driven by a belt 238 trained over the pulley 240 of a motor M.

Referring to FIGURE 2, it will be noted that a different piece of work is disposed at each of the stations A through H. These pieces of work are designated respectively 242, 252, 254, 244, 246, 248, 250 and 256. At station D staying material fed from a roll thereof (not shown) is designated 258, and stays cut from such rolls and applied to the work are designated 260.

In the opening of the machine, at the beginning of a cycle, the shaft 226 makes one complete revolution. After approximately one-third of the revolution pin 222 engages wheel 208, and after approximately two-thirds of the revolution the pin 222 disengages from the wheel 208, which has been turned 45 degrees. While engaged with the wheel 208 the pin 222 indexes the same one station. This indexing operation occurs once during each cycle. During the indexing operation the shoulder 220 clears the wheel 208, and before and after the indexing operation the shoulder 218 fits into a scalloped peripheral portion of the wheel 208 and secures the wheel against turning.

Immediately after the indexing operation, air under pressure is supplied to the several air cylinders 194 for extending the work holders 204. At station A the fingers 206 of the work holder engage a blank 242 which is cornered and scored for folding and disposed in the frame 28, and as the work holder is extended, the fingers push the blank outwardly, removing it from the frame and forming it over the mandrel 20. Thus the side panels of the blank are folded up normal to the bottom panel. At stations D, E, F and G other blanks, respectively designated 244, 246, 248 and 250, are pushed outwardly over the anvils 133 and underlying nose pieces 132. Thus each anvil 133 is nested in a corner of the associated blank, in position for the staying operation. While the work holders 204 are fully extended, various operations are performed substantially simultaneously at stations B through H, but nothing further occurs at station A.

At station B the blank 252 which, during the last cycle of the machine, had its side panels folded up at station A, has two opposite side panels over-folded approximately 120 degrees. Air under pressure is supplied to cylinders 36 and 50 for actuating the over-fold arms 48 and 62. The arrangement is such that arm 48 operates slightly in advance of arm 62, as a consequence of which the side panels are folded sequentially to avoid interference with one another. The arms pivot on pin 64 from the full to the broken line positions shown in FIGURE 2, the furcations passing freely between the fingers 206. At station C the over-fold operation is performed upon the blank 254, which during the last cycle of the machine had two opposite side panels over-folded at station B.

Figure 3:
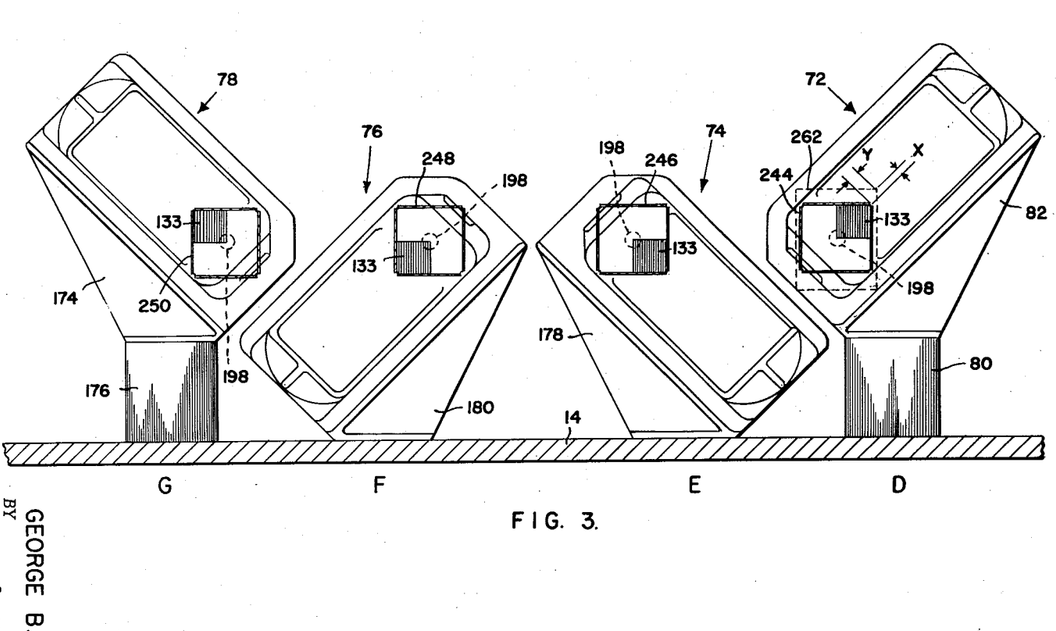
FIGURE 3 is a developed elevation vertical section looking from the center of the machine outwardly, showing the orientation of the staying devices.

At stations D through G stays are applied to the corners of the blanks 244, 246, 248 and 250. Referring particularly to FIGURE 3, at station D the stay is applied to the upper right-hand corner of the blank 244, and at station E the stay is applied to the lower right-hand corner of the blank 246, at station F the stay is applied to the lower left-hand corner of the blank 248 and at station G the stay is applied to the upper left-hand corner of the blank 250. At each station air under pressure is supplied to cylinder 128 to extend the rod 130 and the die mount 112. At the end of the working stroke the die insert 126 engages the strip of stay material 258 and folds the same longitudinally over and attaches it to the corner areas of the side panels in known manner. At the same time the cutter 134 operates in known manner to cut the stay 260 from the strip of stay material.

As the die mount 112 descends, the screw 170 engages arm 162 of the bell crank and swings the same counterclockwise about the pivot 158 against the influence of the spring 172, whereupon the arm 156 of the bell crank shifts the pawl carrier 150 to the right as viewed in FIGURE 5. Pawl 148 holds the strip of stay material. Pawl 152 ratchets freely over the stay material as it moves to the right. As the die mount 112 returns to its initial position the bell crank swings clockwise under the influence of tension spring 172. Pawl carrier 150 moves to the left and the pawl 152 engages the stay material and feeds it toward the die insert 126. Pawl 148 ratchets freely over the stay material.

At station H a jet of air from the nozzle 182 dislodges a fully folded and stayed box 256, which is gravity-discharged onto the conveyor belt 184. It will be noted that one blank is fed to the machine at station A at the beginning of each cycle and one fully formed and stayed box is discharged at station H at the end of each cycle.

To effect a change over from the fabrication of one size and/or shape of box to the fabrication of another size and/or shape of box, the mandrel 20 and the work holders 204 must be changed, but no parts of the staying devices need to be changed. In this connection, it will be noted that a holder 204 positions the blank held therein so that the longitudinal axis of the rod 198 passes through the center of the bottom panel of the blank.

Referring to FIGURE 3, and particularly to station D, the staying device 72 is adjusted for operation upon a square box 244. To change over for operation upon a rectangular box 262, shown in broken lines, it would merely be necessary to shift the effective staying members laterally, the distance designated X, and longitudinally, the distance designated Y. The first of these adjustments may be effected by loosening the studs 94, shifting the plate 90 laterally as required and then retightening the studs 94. The second of these adjustments may be effected by loosening the studs 102, shifting the frame 98 longitudinally as required and then retightening the studs 102.

It should be noted that the operation of the machine is not slowed up by the necessity for loading and unloading at the same station. In addition, the fold, over-fold and staying mechanisms are all incorporated in one machine. Furthermore, the heavy forces exerted by the stay applying members are not transmitted to the indexing device.

Figure 7:
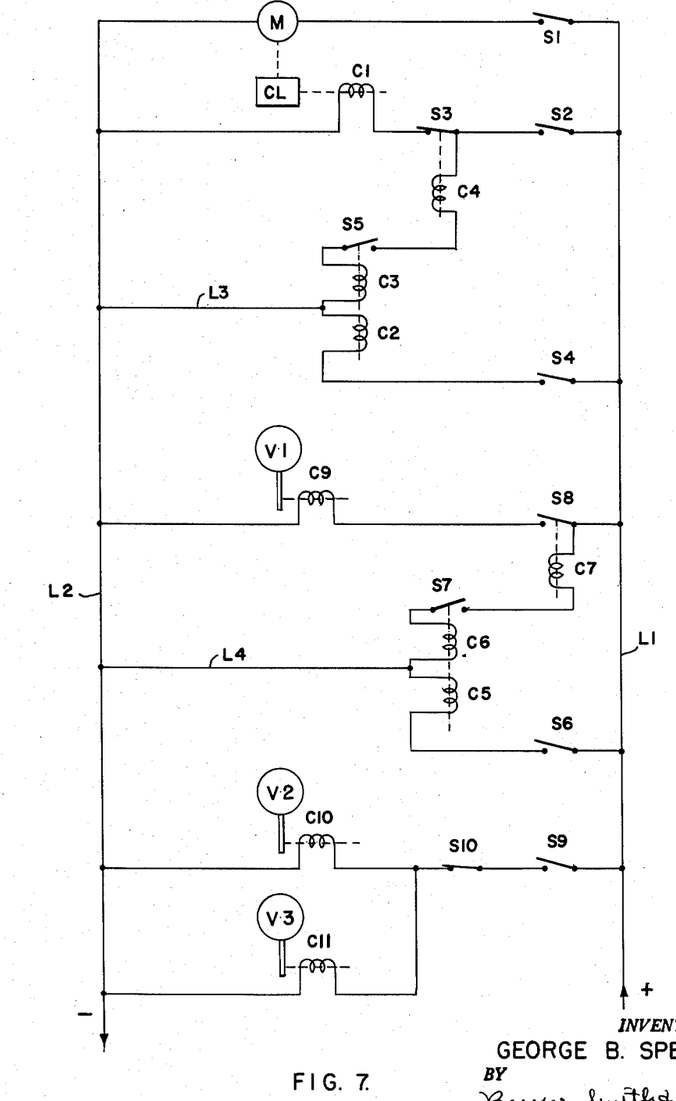
FIGURE 7 is a wiring diagram.

Now referring particularly to the wiring diagram, electric power is supplied through main leads L1 and L2. The motor M and a switch S1 are connected in series across leads L1 and L2. Switches S2, S3 and a coil C1 are connected in series across leads L1 and L2. A coil C4, switch S5 and a coil C3 are connected in series between the high side of switch S3 and lead L2 through a lead L3. A switch S4 and a coil C2 are connected in series across leads L1 and L2 through the lead L3, the latter being connected between coils C2 and C3. A switch S8 and a coil C9 are connected in series across the leads L1 and L2. A coil C7, a switch S7 and a coil C6 are connected in series between the leads L1 and L2 through a lead L4. A switch S6 and a coil C5 are connected in series across the leads L1 and L2 through the lead L4, the latter being connected between coils C5 and C6. A switch S9, a switch S10 and a coil C10 are connected in series across the leads L1 and L2, and a coil C11 is connected in parallel with the coil C10. C1 is the coil of a solenoid that controls the clutch CL. Switches S1 and S2 are manually operated switches while switches S3, S5, S7 and S8 are solenoid controlled switches. C9, C10 and C11 are the coils of solenoids that control respectively valves V1, V2 and V3. S4 and S6 are switches operated by the single revolution shaft 226. S9 is a switch which is operated by a rod 198, and S10 is a switch which is operated by a die mount 112.

When the machine is to be operated the switch S1 is closed, whereupon power is supplied to the motor M, which runs continuously. The clutch CL is disengaged, and therefore the motor M does not drive the single revolution shaft 226. Now the switch S2 is closed, whereupon coil C1 is energized through switch S2 and switch S3 and clutch CL operates to clutch the motor M to the shaft 226. Just before turning a full 360 degrees, the shaft 226 closes and then immediately releases switch S4. While switch S4 is closed coil C2 is energized, whereupon switch S5 is closed causing coils C3 and C4 to become energized. Coil C3 holds switch S5 closed after switch S4 reopens, and coil C4 holds switch S3 open to declutch the motor from the shaft 226. Switch S5 is reopened by a die mount 112 when the latter reaches the end of its return stroke, i.e., at the end of the cycle, whereupon coils C3 and C4 are deenergized and switch S3 recloses. Thus the circuit is restored to initial condition except that switch S2 remains closed for automatically starting a new cycle.

Valve V1 is a two-way valve, normally in a spring biased position in which air is supplied to retract the work holders 204. Switch S6 is closed by the single revolution shaft 226 after the indexing operation has occurred and then immediately released. When switch S6 is closed, coil C5 is energized, whereupon switch S7 is closed. When switch S7 closes, coils C6 and C7 are energized. Coil C6 holds switch S7 closed after switch S6 reopens. Coil C7 closes switch S8, whereupon coil C9 is energized, and valve V1 is operated against the influence of its spring bias. In the second position thereof, air is supplied to the cylinders 194 for extending the work holders 204.

Valve V2 is a two-way valve, normally in a spring biased position in which air is supplied to the cylinders 36, 50 and 128 to retract the rods 38, 52 and 130. Switch S9 is closed by a rod 198 at the end of the latter's outward stroke, whereupon coil C10 is energized and valve V2 is operated against the influence of its spring bias. In the second position thereof, air is supplied to the cylinders 36, 50 and 128 for extending the rods 38, 52 and 130, whereupon the over-fold devices operate and the die mounts 112 descend. The rod 198 holds the switch S9 closed until the die mounts 112 reach the end of their downward strokes, whereupon one of the die mounts 112 opens switches S7 and S10. C10 is deenergized and valve V2 returns to its initial position under the influence of its spring bias, in which position air is supplied to retract the over-fold devices and the die mounts 112. When switch S7 reopens coils C6 and C7 are deenergized, as a consequence of which switch S8 reopens, whereupon coil C9 is deenergized and valve V1 returns to its initial position under the influence of its spring bias. The cycle ends when the over-fold devices and the die mounts are restored to their initial positions. As the die mount approaches the end of its return stroke, the switch S5 is reopened and the switch S10 is reclosed by the die amount 112.

Valve V3 is a one-way valve, normally in a spring biased position in which it is closed. Coil C11 is energized and deenergized in step with coil C10. Therefore air for ejecting a box at station H is supplied during the working stroke of the die mount 112.

It will be understood, of course, that the present invention, as shown and described, is susceptible of various changes and modifications which may be made without departing from the principles of the invention. Accordingly, it is intended to claim the present invention broadly as well as specifically as indicated in the appended claims.

What is claimed is:

1. In a multi-station machine for applying corner stays to the corners of boxes having folded up side panels, the combination comprising a plurality of stayer means disposed respectively at a plurality of fixed stations and each adapted for applying a corner stay to one corner of an associated piece of work, means for feeding pieces of work having unstayed corners to one of said stations, means for removing finished pieces of work from another of said stations, and means encircled by said stations and operable repeatedly for intermittently advancing the several pieces of work simultaneously and each progressively from station to station, the several staying means being operable substantially simultaneously and in predetermined timed relation to said work advancing means for operating upon the associated several pieces of work during the intervals between work advancing movements.

2. In a multi-station machine for applying corner stays to the corners of boxes having folded up side panels, the combination comprising a plurality of stayer means disposed respectively at a plurality of fixed stations and each adapted for applying a corner stay to one corner of an associated piece of work, and revolvable means encircled by said stations and operable repeatedly for intermittently advancing the several pieces of work simultaneously and each progressively from station to station including means for initially feeding pieces of work having unstayed corners to one of said stations, and means for finally removing finished pieces of work from another of said stations, the several staying means being operable substantially simultaneously and in predetermined timed relation to said work advancing means for operating upon the associated several pieces of work during the intervals between work advancing movements.

3. In a multi-station machine for applying corner stays to the corners of boxes having folded up side panels, the combination comprising a plurality of means disposed respectively at a plurality of fixed stations including means at least at one of said stations for over-folding side panels of the associated piece of work, stayer means respectively at a plurality of others of said stations each adapted for applying a corner stay to a corner of the associated piece of work, and means encircled by said stations and operable repeatedly for intermittently advancing the several pieces of work simultaneously and each progressively from station to station including means for initially feeding pieces of work having folded up side panels to said over-fold station, and means for finally removing finished pieces of work from another of said stations, the several over-folding and staying means being operable substantially simultaneously and in predetermined timed relation to said work advancing means for operating upon the associated several pieces of work during the intervals between work advancing movements.

4. In a multi-station machine for folding box blanks and applying corner stays to the corners thereof, the combination comprising a plurality of means disposed respectively at a plurality of fixed stations including means at a first one of said stations adapted for folding up the side panels of the associated piece of work, means respectively at a plurality of others of said stations each adapted for over-folding side panels of the associated piece of work, means respectively at a plurality of still others of said stations each adapted for applying a corner stay to a corner of the associated piece of work, and means at a last one of said stations for ejecting the associated piece of work from the machine, and means encircled by said stations and operable repeatedly for intermittently advancing the several pieces of work simultaneously and each progressively from said first mentioned to said last mentioned station, said over-folding, staying and ejecting means being operable substantially simultaneously and in predetermined timed relation to said work advancing means for operating upon the associated several pieces of work during the intervals between work advancing movements.

5. In a multi-station machine for applying corner stays to the corners of boxes having folded up side panels, the combination comprising a plurality of stayer means disposed respectively at a plurality of fixed stations and each adapted for applying a corner stay to one corner of an associated piece of work, means for feeding pieces of work having unstayed corners to one of said stations, means for removing finished pieces of work from another of said stations, and means encircled by said stations and operable repeatedly for intermittently advancing the several pieces of work simultaneously and each progressively from station to station in a predetermined manner irrespective of the size and/or shape of the work, each staying means being selectively shiftable for accommodating work pieces varying in size and/or shape, and the several staying means being operable substantially simultaneously and in predetermined timed relation to said work advancing means for operating upon the associated several pieces of work during the intervals between work advancing movements.

6. In a multi-station machine for applying corner stays to the corners of boxes having folded up side panels, the combination comprising a plurality of stayer means disposed respectively at a plurality of fixed stations and each adapted for applying a corner stay to one corner of an associated piece of work, means for feeding pieces of work having unstayed corners to one of said stations, means for removing finished pieces of work from another of said stations, and means encircled by said stations and operable repeatedly for intermittently advancing the several pieces of work simultaneously and each progressively from station to station, each piece of work being presented successively to each of said staying means with the open top thereof leading and with the center of the work in a predetermined position irrespective of the size and/or shape of the work, each staying means being selectively shiftable for accommodating work pieces varying in size and/or shape, and the several staying means being operable substantially simultaneously and in predetermined timed relation to said work advancing means for operating upon the associated several pieces of work during the intervals between work advancing movements.

7. In a multi-station machine for applying corner stays to the corners of boxes having folded up side panels, the combination comprising a plurality of stayer means disposed respectively at a plurality of fixed stations and each including a fixed member and a coacting movable member adapted for applying a corner stay to one corner of an associated piece of work, means for feeding pieces of work having unstayed corners to one of said stations, means for removing finished pieces of work from another of said stations, and means encircled by said stations and operable repeatedly for intermittently advancing the several pieces of work simultaneously and each progressively from station to station, each piece of said work being presented successively to each of said staying means with the open top thereof leading, the center of the work in a predetermined position irrespective of the size and/or shape of the work and a corner thereof overlying the fixed one of the staying members, each staying means being selectively shiftable for effecting stay applying registration with work pieces varying in size and/or shape, and the several staying means being operable substantially simultaneously and in predetermined timed relation to said work advancing means for operating upon the associated several pieces of work during the intervals between work advancing movements.

8. In a multi-station machine for applying corner stays to the corners of boxes having folded up side panels, the combination comprising a plurality of means disposed respectively at a plurality of fixed stations including means at least at one of said stations for sequentially over-folding side panels of the associated piece of work, stayer means respectively at a plurality of others of said stations each adapted for applying a corner stay to a corner of the associated piece of work, and means encircled by said stations and operable repeatedly for intermittently advancing the several pieces of work simultaneously and each progressively from station to station including means for initially feeding pieces of work having folded up side panels to said over-fold station, and means for finally removing finished pieces of work from another of said stations, the several over-folding and staying means being operable substantially simultaneously and in predetermined timed relation to said work advancing means for operating upon the associated several pieces of work during the intervals between work advancing movements.

9. In a multi-station machine for applying corner stays to the corners of boxes having folded up side panels, the combination comprising a plurality of means disposed respectively at a plurality of fixed stations including means at a plurality of said stations each adapted for sequentially over-folding a pair of opposite side panels of the associated piece of work, stayer means respectively at a plurality of others of said stations each adapted for applying a corner stay to a corner of the associated piece of work, and means encircled by said stations and operable repeatedly for intermittently advancing the several pieces of work simultaneously and each progressively from station to station including means for initially feeding pieces of work having folded up side panels to one of said over-fold stations, and means for finally removing finished pieces of work from another of said stations, the several over-folding and staying means being operable substantially simultaneously and in predetermined timed relation to said work advancing means for operating upon the associated several pieces of work during the intervals between work advancing movements.

10. In a multi-station machine for folding box blanks and applying corner stays to the corners thereof, the combination comprising a plurality of means disposed respectively at a plurality of fixed stations including means at a first one of said stations adapted for folding up the side panels of the associated piece of work, said folding means including a fixed mandrel, a coacting movable member, and means interposed between said mandrel and movable member for receiving a flat, unfolded box blank and positioning the same for being folded over said mandrel upon actuation of said movable member, means respectively at a plurality of others of said stations each adapted for applying a corner stay to a corner of the associated piece of work, means at a last one of said stations for ejecting the associated piece of work from the machine, and means encircled by said stations and operable repeatedly for intermittently advancing the several pieces of work simultaneously and each progressively from said first mentioned to said last mentioned station, said staying and ejecting means being operable substantially simultaneously and in predetermined timed relation to said work advancing means for operating upon the associated several pieces of work during the intervals between work advancing movements.

11. In a multi-station machine for applying corner stays to the corners of boxes having folded up side panels, the combination comprising a plurality of stayer means disposed respectively at a plurality of fixed stations and each adapted for applying a corner stay to one corner of an associated piece of work, and means encircled by said stations and the several staying means respectively located thereat, said encircled means being revolvable free of said staying means and being operable repeatedly for intermittently advancing the several pieces of work simultaneously and each progressively from station to station including means for initially feeding pieces of work having unstayed corners to one of said stations, and means for finally removing finished pieces of work from another of said stations, the several staying means being operable substantially simultaneously and in predetermined timed relation to said work advancing means for operating upon the associated several pieces of work during the intervals between work advancing movements.

12. In a multi-station machine for applying corner stays to the corners of boxes having folded up side panels, the combination comprising a plurality of stayer means disposed respectively at a plurality of fixed stations and each adapted for applying a corner stay to one corner of an associated piece of work, means for feeding pieces of work having unstayed corners to one of said stations, means for removing finished pieces of work from another of said stations, means encircled by said stations and operable repeatedly for intermittently advancing the several pieces of work simultaneously and each progressively from station to station, and means for operating said staying means and work advancing means in predetermined time relation automatically in repeated cycles.

References Cited in the file of this patent

UNITED STATES PATENTS

| | | |
|---|---|---|
| 877,891 | Horton | Jan. 28, 1908 |
| 2,332,644 | Junkin | Oct. 26, 1943 |
| 2,416,748 | Gnoerk | Mar. 4, 1947 |